P. P. Gardner.
Corn Planter.
No. 92,184.    Patented July 6. 1869.
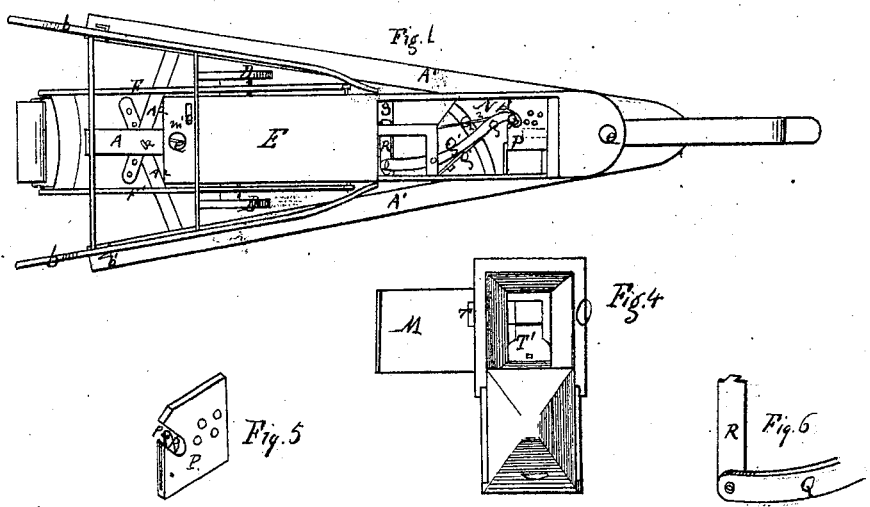
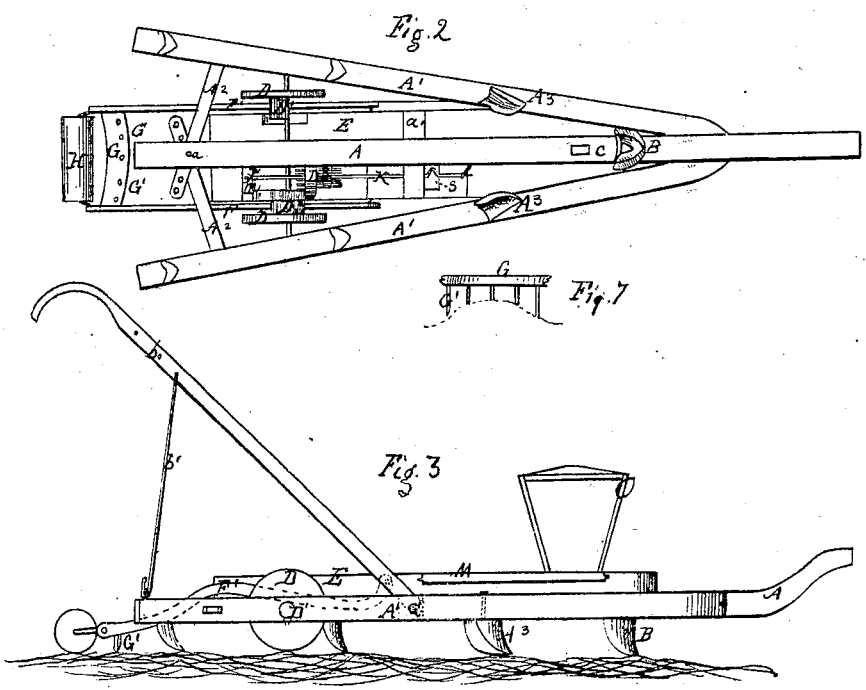
Witnesses
Daniel Breed
Edward Moss
Inventor
P. P. Gardner
by T. A. Connolly his atty.

United States Patent Office.

P. P. GARDNER, OF STONEBOROUGH, PENNSYLVANIA.

Letters Patent No. 92,184, dated July 6, 1869.

---

IMPROVEMENT IN COMBINED CORN-DROPPER AND CULTIVATOR.

---

The Schedule referred to in these Letters Patent and making part of the same.

---

*To all whom it may concern:*

Be it known that I, P. P. GARDNER, of Stoneborough, in the county of Mercer, and State of Pennsylvania, have invented a new and useful Combined Corn-Dropper and Cultivator; and I do hereby declare the following to be a full, clear, and exact description thereof, reference being had to the accompanying drawings, forming part of this specification, in which—

Figure 1 is a plan view, with hopper removed.
Figure 2 is a bottom view.
Figure 3, side elevation.
Figure 4, plan view of hopper, with sliding lid.
Figure 5, perforated slide.
Figure 6, hooked lever-joint, and section of lever for operating perforated slide.
Figure 7, harrow.

My invention relates to a combination corn-dropper and cultivator, which may be readily converted from a combination to a simple implement, viz, a cultivator; and consists particularly in the construction, arrangement, and operation of the various parts or mechanism comprising and attached to the corn-dropping portion of the combination-implement, so that the whole operates to form drills to drop the grain in separate quantities, the amount of which may be regulated as required to cover the grain in suitable hills and roll the earth.

In order that a clear and definite idea may be had of my invention, I submit the following detailed description of the same, and First, the cultivator best adapted is that shown in the accompanying drawings, having a V-shaped frame, consisting of the centre-bar A and the oblique bars $A^1$, hinged or pivoted near the forward end to bar A.

Said oblique bars are provided, near their rear ends, with the adjusting bars $A^2$ extending at right angles therefrom, and crossing each other within a slot formed in the centre-bar A, in which they are held and adjusted by the pin *a*, said adjusting bars being provided with a series of holes each, for such purpose.

Attached to the cultivator-frame are the adjustable handles *b*, which are pivoted to the ends of a cross-piece, *a'*, situated about midway between the ends of the cultivator-frame, and are raised and lowered by means of the hook-ended rods *b'*, which, being attached to the frame of the cultivator, have their hook-ends inserted in holes in the handles.

It is also provided with a number of teeth, for the purpose of forming the drills, and cultivating, one of which, B, for drills, is placed in the centre of the cultivator-frame, attached to the forward part of the centre piece A, and the others to the oblique bars $A^1$.

A seed-opening, *c*, is formed in the centre piece A, immediately back of the drill B, to correspond with a similar opening on the frame of the corn-dropper.

When used in combination with the corn-dropper, the cultivator has a pair of wheels, D, which have their axle-bearing in the oblique bars $A^1$.

The axle of these wheels is provided with an oval cam, $D^1$, resting against or near the inner surface of one of the wheels, and also with a crown-toothed wheel, $D^2$, or equivalent gearing-device, situated near or against the opposite wheel.

Said wheels are removable by widening the cultivator, which is done by means of the adjusting-bars before mentioned.

Second, the part marked E is the frame or bed of the corn-dropper, of the general form represented in the drawings attached to the centre piece A of the cultivator-frame by removable bolts, screws, or equivalents, *e*, inserted at each end of the bed.

F F' are curved arms, pivoted to the sides of the bed or frame E, thence reaching back, are joined by a cross-bar, G, and provided with a land-roller, H, working on a swinging-axle, the ends of which are held by staples attached to the cross-bars, or in any other suitable manner.

The cross-piece G contains on its under side a curved row of harrow-teeth, G', of different lengths, increasing in size from the middle towards each end, so as to aid in forming hills, leaving the corn covered in the centre of the hills three inches, or as deep as desired.

The arms F F' extend back between the wheels, and tend downward at their rear ends.

The arm F', which passes over and rests on the cam $D^1$, is so formed, as clearly shown in fig. 3, that it shall, with its several connections, viz, the harrow and roller, be alternately raised and permitted to fall by the cam, and is down when passing over each hill of corn, and up when passing between them, thus leaving all stones or rough clods.

On the under side of the corn-dropper frame is a shaft, K, extending lengthwise of the frame, to one side from the centre, and has its bearings in the staples or boxes *l l*, one of which, *l*, is connected directly with the frame E, and the other with a bevelled block, *m*, fitting in a dovetailed recess, directly above which is a slot, holding a screw, *m'*, attached to bevelled block.

The shaft K is formed at a point under the hook-ended arm hereafter described, with a crank, which, as the shaft revolves, takes hold of hook-ended arm, and communicates motion to its different connections.

This shaft holds a gear-wheel, $D^3$, having two faces, on each of which is a different-sized row of teeth. It is operated by the wheels D.

In the forward part of the frame E, a recess or box, N, is formed, nearly half the length thereof, and almost as wide as the frame, which is covered by a sliding-lid, M, having a seed-opening, and a hopper, O.

At the forward end of the said recess is a seed-opening, which communicates with a similar opening in the cultivator centre-piece A.

Over these openings is a slide, P, perforated toward one end, as shown.

This slide is grooved in one side, and an arm, $p$, pivoted therein, which ends in a semicircular recess, $p'$, and is provided with an eye to hold end of lever Q.

Q is an S-shaped lever, pivoted to the arm $p$, thence curving across the box, and to its rear end is fulcrumed about the centre, and pivoted to an arm, R, extending across the recess N, and terminating in a downward hook in a slot, S, on the side of the frame on which is the shaft K.

T is a slide, to cover the discharge-opening in hopper, when it is not desirable to drop the corn, and also to regulate the amount of discharge.

$Q^1$ is a spring in recess N, to return lever Q to its place, when moved.

$Q^2$, spring, to return slide when backing the machine.

The operation of the corn-dropper is as follows:

The corn being placed in the hopper, drops into the perforations in the slide, which is then, by the devices described, moved until the perforations correspond with the seed-openings in the frames, out of which it drops, and is followed by the teeth of the cultivator with the harrow and roller.

The distance of the corn-hills may be regulated by reversing the gear-wheel $D^3$, or by substituting a smaller or larger wheel, as desirable.

A very important point in this invention is that the corn is not dropped in backing the implement; in which case the perforated slide is moved toward the nearer side of the recess, and not over the opening.

T' is a standing block in the bottom of the hopper, to conduct the corn or seed to the opening.

The attachments marked $A^3$, designated as teeth in the foregoing description, it will be seen, are somewhat of the shape of common plowshares. They are attached to the oblique bars $A^1$ by removable bolts, or equivalents, so that in planting corn they may be used with their landsides inward, so as to throw the earth over the corn, but when cultivating simply, they are to be changed from one side of the cultivator to the other, thus throwing the earth outward.

What I claim as my invention, and desire to secure by Letters Patent, is—

1. The slide $p$, lever Q, springs $Q^1$ $Q^2$, arm R, shaft K, arranged and operated by suitable gearing and driving-wheels, substantially as and for the purpose set forth.

2. The roller H, harrow G, arms F F', cam $D^1$, and driving-wheels D, in combination with the elements of first claim, and V-shaped cultivator, when arranged and operating substantially as and for the purpose set forth.

3. In combination with the frame E and the shaft K, the bevelled block $m$, with screw $m'$, as and for the purpose specified.

4. In combination with the rollers H, harrow G, arms F F', cam $D^1$, and driving-wheels D, the adjustable teeth or shares $A^3$, substantially as specified.

P. P. GARDNER.

Witnesses:
   J. C. HILL,
   M. DAVIS.